United States Patent [19]

Lawhon et al.

[11] Patent Number: 5,086,166
[45] Date of Patent: Feb. 4, 1992

[54] PROTEIN FOODS AND FOOD INGREDIENTS AND PROCESSES FOR PRODUCING THEM FROM DEFATTED AND UNDEFATTED OILSEEDS

[75] Inventors: James T. Lawhon; Khee C. Rhee; Edmund W. Lusas, all of College Station, Tex.

[73] Assignee: The Texas A&M University System, College Station, Tex.

[21] Appl. No.: 453,206

[22] Filed: Dec. 26, 1989

Related U.S. Application Data

[63] Continuation of Ser. No. 14,725, Feb. 13, 1987, abandoned.

[51] Int. Cl.⁵ .......................... A23J 1/14; A23J 3/16; C07K 3/02; C07K 3/26
[52] U.S. Cl. .................................. 530/378; 426/598; 426/656; 530/377
[58] Field of Search ................ 426/598, 656; 530/377, 530/378

[56] References Cited

U.S. PATENT DOCUMENTS

| | | | |
|---|---|---|---|
| 3,622,556 | 11/1971 | O'Connor | 260/123.5 |
| 3,728,327 | 4/1973 | Frazeur et al. | 260/123.5 |
| 3,736,147 | 5/1973 | Iacobucci et al. | 99/17 |
| 3,865,802 | 2/1975 | Mustakas | 530/378 |
| 3,901,978 | 8/1975 | Nelson et al. | 426/565 |
| 3,940,495 | 2/1976 | Flier | 426/104 |
| 3,993,636 | 11/1976 | Maubois et al. | 260/123.5 |
| 3,995,071 | 11/1976 | Goodnight, Jr. et al. | 426/598 |
| 4,041,187 | 8/1977 | Nelson et al. | 426/598 |
| 4,058,510 | 11/1977 | Concilio-Nolan | 530/378 |
| 4,064,283 | 12/1977 | Saunders et al. | 426/583 |
| 4,072,670 | 2/1978 | Goodnight, Jr. et al. | 260/123.5 |
| 4,088,795 | 5/1978 | Goodnight, Jr. et al. | 426/598 |
| 4,091,120 | 5/1978 | Goodnight, Jr. et al. | 426/598 |
| 4,119,733 | 10/1978 | Hsieh et al. | 426/50 |
| 4,188,399 | 2/1980 | Shemer | 530/378 |
| 4,194,018 | 3/1980 | Hodel et al. | 426/598 |
| 4,208,323 | 6/1980 | Murray et al. | 530/377 |
| 4,225,629 | 9/1980 | Saunders et al. | 426/583 |
| 4,241,100 | 12/1980 | Wakana et al. | 426/598 |
| 4,284,656 | 8/1981 | Hwa | 530/378 |
| 4,307,118 | 12/1981 | Kajs | 530/377 |
| 4,409,256 | 10/1983 | Johnson et al. | 426/598 |
| 4,420,425 | 12/1983 | Lawhon | 260/123.5 |
| 4,435,319 | 3/1984 | Pearce | 260/123.5 |
| 4,697,004 | 9/1987 | Puski et al. | 530/378 |

OTHER PUBLICATIONS

Kajs, et al., "Tamucurd A High-protein Ingredient", Food Technology, 82-86 (Jul. 1979).

*Primary Examiner*—Jeffrey E. Russel
*Attorney, Agent, or Firm*—Arnold, White & Durkee

[57] ABSTRACT

True oilseed protein curd products are produced from defatted and undefatted oilseeds and oilseed materials without inherent undesirable components responsible for poor taste, odor and color. The curds are produced through alkali and water extraction of proteins from the insoluble components. Ultrafiltration of the protein extraction both purifies and concentrates the desirable high molecular weight protein macromolecules from the smaller (less than 50,000 daltons) less desirable ones. Further treatment with heat, acid and/or salt coagulates the protein to form a meat-like, chewy true curd which will not disintegrate when boiled. Extraction of a storage protein fraction from glandless cottonseed by the same method will also yield a true curd never before possible.

21 Claims, 3 Drawing Sheets

PROTEIN FOODS AND FOOD INGREDIENTS AND PROCESSES FOR PRODUCING THEM FROM DEFATTED AND UNDEFATTED OILSEEDS

This is a continuation of copending application Ser. No. 014,725 filed on Feb. 13, 1987, now abandoned.

BACKGROUND OF THE INVENTION

1. Field of the Invention

The present invention relates generally to food product comprising a true oilseed protein curd substantially free of undesirable flavor, color and odor causing compounds. Produced from defatted and/or undefatted oilseeds, the oil content may be regulated so as to produce a variety of textures and consistencies ranging from a firm, chewy meat-like product to a softer, moister, spongy product. Lacking undesirable flavor, odor and color causing compounds, the food product is bland in taste so as to permit its flavor and color enhancement by addition of desired seasonings and food colors. This invention also relates to methods useful in making the desired food product.

2. Related Art

It is the consensus of authorities in the area of world food requirements that oilseed proteins for direct consumption in human foods are the most promising means of solving the protein shortages that exist in the diets of over half the world's population (NSF/MIT Protein Resources Study, 1975).

Soybeans, cottonseed, peanuts, sunflower seeds, sesame seeds and safflower seeds have been known for some time to be valuable and plentiful sources of protein. They are of excellent nutritional value in that they provide high protein with low carbohydrate constituents. Due to their abundance in nature, they also possess the potential of being relatively economical sources of protein. The low fat aspect of food ingredients made from proteins isolated from these oilseeds make them especially popular in today's health conscious society.

Soybeans are by far the world's leading oilseed crop and account for 53% of the total oilseed tonnage grown, supplying 67% of the world's feed protein resources and 35% of the edible vegetable oil production. Unfortunately, phenolic compounds and enzymes present in the soybean cause undesirable bean-like or painty flavor and odor in the final soybean protein products conventionally manufactured.

Objectionable flavor has been cited as one of the main factors limiting the use of soybean products in foods (Beckel and Smith 1944, Kalbrener et al. 1971).

Several types of compounds have been charged as being responsible for soybean's characteristic beany and bitter taste. Phenolic compounds, enzyme systems, aliphatic carbonyls, volatile fatty acids, amines, esters and alcohols are identified most frequently as the problem source. Phenolics also cause adverse color, flavor and anti-nutritional problems in the other oilseeds such as sunflower.

A significant part of the undesirable flavor and odor in soybeans is caused by the enzyme lipoxygenase, which catalyzes the oxidation of polyunsaturated oils and fats which are also present in the whole seeds. The reaction takes place quickly whenever:

(1) the seed structure is damaged, as when the seed is bruised, cracked, or ground so that the enzyme, lipoxygenase and oil are permitted to contact each other; and (2) a minimum amount of water is present during extraction of oil and protein.

Therefore, care must be taken when the beans are ground and comminuted; otherwise, the enzyme reaction will result in a poor-tasting final product. (U.S. Pat. No. 3,901,978—Nelson et al., 1975).

In recent years, consumption of high-protein, wet-curd type products from soybeans (especially tofu) has increased significantly in the United States despite their characteristic soybean taste. Such foods, though initially confined to the health foods market, now are expected to become dietary staples at some American tables. By 1982, the annual production of tofu in the United States had risen to 27,500 tons, with sixteen percent of the product being sold through restaurants. The manufacture of high-protein wet curds has emerged from a cottage industry to a line of consumer-oriented packaged products sold competitively in supermarkets. For example, the largest domestic tofu manufacturer now produces over 200,000 pounds weekly.

The development of edible protein products from cottonseed, the world's second most important oilseed, has been impeded primarily by two factors: the presence of gossypol and the primary importance placed on the economic value of cottonseed oil. Gossypol, a highly reactive, yellow polyphenolic binaphytaldehyde, occurs in pigment glands which appear as dark specks in ordinary cottonseed. Gossypol is toxic to nonruminant (monogastric) animals including humans, and thus produces adverse physiological effects when ingested. It also imparts a yellow undesirable color to cottonseed protein products.

In the early 1950s, USDA cotton geneticists discovered that by making selections and crosses of cottons grown by the Hopi Indians they could produce cotton which contained few, if any, pigment glands in the seed. Thus, pigment glands and gossypol can be eliminated through breeding to produce "glandless cottonseed".

Hence, the introduction of glandless cotton, which is essentially free of pigments (and gossypol) has enabled glandless cottonseed protein to be beneficially consumed by humans. Researchers have demonstrated the utility and nutritional advantages of glandless cottonseed protein and protein derivatives in a wide variety of food products and food ingredients.

Glandless cottonseed contains two distinct protein components known as storage (SP) and nonstorage protein (NSP). Storage protein is considered as originating from discreet bodies deposited within the seed while the non-storage protein is regarded as the cement which holds the different structures in the seeds together. Nonstorage and storage protein fractions have different functional and nutritional properties which offer considerable latitude in the applications that can be made of them. Nonstorage protein isolates possess better whipping properties than storage protein isolates while storage protein has superior heat gelation properties (Lawhon and Cater, 1971). NSP isolates contain low molecular weight, water-soluble proteins, and have a minimum water solubility at pH 4. SP isolates contain high molecular weight proteins and have a minimum water solubility at a pH of 7 (Martinez et al., 1970).

Storage protein isolates have proven highly satisfactory in bread fortification which can double the protein content of a loaf of wheat bread without affecting its taste or structure. Since they are highly soluble at lower (acidic) pH levels, they are also suitable for the protein fortification of beverages (Lusas et al., 1977).

Most of the prior art processes have attempted to provide an acceptable food substitute or supplement from the aforementioned types of oilseeds which have the desired properties of smooth texture, light color, and bland taste with no odor. For the most part, however, attempts to reach these goals have been unsuccessful. Secondly, the complexities that have been involved in providing these qualities have only been possible through extensive processing steps which increase the cost of the final product.

Oilseed protein isolation processes following the conventional art generally use defatted flakes, meal or flour as a starting material. Protein is extracted from the defatted material using a dilute alkali and then the insoluble residuals are separated by centrifugation. The pH of the liquid extract is then adjusted with an appropriate acid to the point of minimum protein solubility to precipitate the maximum amount of protein. Precipitated protein, also known as curd, is generally adjusted to slightly below neutral pH and spray-dried.

Stephen C. P. Hwa, U.S. Pat. No. 4,284,656, patented Aug. 18, 1981, disclosed a process for the preparation of a soybean curd product from a defatted soybean material in which a portion of the protein was extracted with water. A low water to defatted soy material ratio was required to obtain an extract with a sufficiently high protein content to precipitate a curd product as desired. Coagulation was accomplished by adjusting the pH to within the range from about 5.4 to about 8.0 and heating the aqueous protein extract to within a temperature range from about 80° C. to about 170° C.

Ultrafiltration is a process or technique for the separation of dissolved materials on the basis of their molecular size and shape by passing the solution through an infinitesimally fine filter. The ultra filter is a tough, thin, selectively permeable membrane which retains most macromolecules above a certain size while allowing the smaller molecules and solvent to pass through as a filtrate. The retained protein macromolecules form the retentate while the smaller sugars, amino acids and salts are removed.

Ultrafiltration then provides a means to remove solvent and salts from a solution of macromolecules without phase changes, temperature extremes, ionic or pH changes which can affect the structure of proteins. In short, it separates the larger molecules from the smaller ones without affecting their structure. High flux membranes have been developed which can retain molecules as small as 500 daltons or as large as 300,000 daltons. Ultrafiltration systems are available in a number of design configurations: spiral wound, hollow fiber, internally-coated tubular and flat leaf systems.

Ultrafiltration used in conjunction with reverse osmosis, another type of membrane process which employs membrane of much smaller pore size, has the advantage of eliminating a waste water effluent, since the reverse osmosis membrane purifies the filtrate to a point where it is cleaner than ordinary tap water. This permits both the recirculation of water previously used to extract the oilseed protein and oil fractions as well as the elimination of a water pollution source. Many prior art processes would be forced to merely discard the unwanted whey (which retains significant amounts of organic matter and other waste constituents) into the environment (Lawhon et al., 1981).

A number of prior art patents describe the use of ultrafiltration membranes in combination with other techniques to separate proteins from unwanted molecules to achieve various end products. Other ultrafiltration techniques have required the addition of various chemical treatments (enzymatic hydrolysis, EDTA etc.) prior to ultrafiltration (Iacobucci et al., U.S. Pat. No. 3,736,147). Others have also required the use of ultrafiltration membranes with prohibitively small molecular weight cut off (MWCO) values which will retain smaller protein molecules with attached phenolic compounds and can result in a bitter-tasting product. One prior art method disclosed for sunflower meal processing required an inert gas blanket (N, He, Ar) prior to membrane ultrafiltration to prevent the formation of off-colors due to extraction of the protein at an alkaline pH (O'Connor U.S. Pat. No. 3,622,556).

SUMMARY OF THE INVENTION

It is a particular feature of the present invention to make protein true curds from oilseeds, wherein the curds are substantially free of the seed components which cause undesirable "beany" flavors, odors and colors. The identities of these compounds are not entirely known, but they appear to be water-soluble and lower in molecular weight than the desired proteins. An aspect of the invention, then is to separate these low molecular weight, detrimental components from the desired proteins. In doing so, a certain amount of low molecular weight proteins are also removed from the desired proteins. As will be more fully explained below, this removal of low molecular weight proteins has proven to be especially desirable in obtaining protein true curds from glandless cottonseeds. True curds, as that term is used in this description, is intended to mean curds which are not disintegrated by boiling water.

It is another feature of the invention to thermally treat the desired proteins after they have been isolated from the low molecular weight, detrimental components and proteins as mentioned above. In general, this is done by heating an aqueous solution or dispersion of the desired proteins at a temperature near the boiling point of water for a time sufficient to produce a true curd upon coagulation of the curd from the aqueous medium. Thus, temperatures above about 80° C., most preferably above 90° C., and approaching 100° C., and times of about 10 to 15 minutes have been very successful in producing true curds with desirable properties. Temperatures above 100° C. are not preferred, because of risks of undesirable, excessive protein denaturation. As mentioned earlier, these curds strongly resemble meat in chewability and cutting characteristics, and they can be readily flavored and colored as desired. By regulating the amount of oil in the curds, a range of product consistency becomes possible.

The term "oilseeds" in this disclosure is intended to mean "non-binding" edible oilseeds—i.e., seeds in which the color and taste components are not chemically or otherwise integrally bound to the desired proteins. Nonbinding oilseeds include soybeans, glandless cottonseeds, safflower seeds, peanuts and sesame seeds, By way of contrast, sunflower seeds include a green color forming component which appears to bind to the protein components of these seeds and remains with the proteins. Of course, to the extent that the green color may become removeable in the future, non-binding true curds from sunflower seeds, as made possible by the present invention, would also be viable food products within the scope of the invention.

The process of the invention may be varied considerably, thus making it possible to vary considerably the curds produced by the process. In general, however, it is preferred that seed materials, including the seeds themselves, undefatted and defatted flakes, meal, etc., be extracted with hot water. In the case of undefatted seeds such as soybeans which contain lipoxygenase, it is preferred that the seeds be ground at a temperature high enough to deactivate this enzyme. In any case, sufficient water should be present to provide a pumpable slurry. Temperatures of about 60° C. and water/bean weight ratios of about 4/1 have proven very effective in grinding soybeans. Somewhat lower temperatures may be used in grinding oilseeds which do not contain lipoxygenase or similarly troublesome components.

In the case of soybeans, the resulting slurry of ground soybeans is diluted with additional hot water (e.g., 60° C.) to form an aqueous protein-containing extract. The pH of the water is neutral or slightly alkaline; and most low molecular components, including color, taste and odor components, remain in the extract with the desired protein fraction. Following physical separation of the extract from non-dispersed components, the extract is preferably sent through an ultrafiltration stage where the filter medium is selected to retain the desired high molecular weight proteins in the retentate, and to pass low molecular weight proteins and undesirable components (color, odor, taste, etc.) through in the permeate. The retentate may also be concentrated in this stage, as by the well known technique of diafiltration. The retentate, now substantially free of the lower weight materials, is now hydrothermally treated, as mentioned earlier, to produce a true curd.

In general, it has been found desirable in the ultrafiltration stages of the present invention to employ filters having a molecular weight cut off (MWCO) of about 100,000 daltons. It is contemplated that a cut off of about 50,000 daltons would be useful; however, it has been observed that the pores of the filters tend to become effectively smaller during use, probably because of some clogging.

When processing undefatted oilseed materials, such as undefatted soybeans as described above, it will be noted that oils or fats will tend to travel through the process along with the high molecular weight proteins. It will also be noted that a selected amount of the oils or fats may be removed during the process (for example, by preliminary solvent treating, or by control of the centrifugation stage). Thus, it is possible to regulate the oil content of the ultimate true curd product, and thereby its physical consistency, chewability, etc.

In the case of glandless cottonseed, a variation in the above process is practiced due to the presence of substantial amounts of low molecular weight, nonstorage protein (NSP). Thus, the pH of the aqueous solvent in a first extraction stage is kept lower than the pH in a second stage. A pH of about 7 is typically used in the first extraction stage to extract nonstorage protein, as well as undesirable odor, taste and color components. The non-extracted high molecular weight (SP) proteins are then extracted in a second extraction stage with a higher pH (about 9.5 or 10) to isolate these proteins from insoluble residues. The latter extract is heat treated and coagulated to obtain a true curd.

In processing glandless cottonseeds, defatted cottonseed flakes, and other cottonseed materials, it is important to note that the nonstorage protein (NSP) must be substantially removed from the storage protein (SP) prior to coagulation of the latter to a true curd. It has been found that, unless this is done, a true curd cannot be realized—at least in practical quantities.

In the heating/coagulation step for all of the various oilseed processes, it is desirable that the solution or dispersion of proteins be relatively concentrated. Concentrations of 3 to 5 weight percent and more are desirable.

The use of the above procedures of the invention to concentrate and purify true curds from undefatted and defatted soybeans, and defatted glandless cottonseed, etc. has not been recognized in the past. The use of larger-pore-sized ultrafiltration membranes (e.g., 100,000 MWCO) to recover and concentrate the desired proteins from the liquid extracts enables one to increase the blandness of the true curds and to reduce the content of flatulence-causing sugars and other compounds that add unwanted color and produce undesirable flavor and odors. Prior art methods have required a concentration of protein in the extract of at least 2% by weight. In order to achieve a protein concentration this high in the extract, a low water:seed material ratio had to be employed in the protein extraction step. The use of such low water:material ratios, however, have resulted in inefficient protein recovery and produced a low yield of protein curd.

The present invention can employ water:seed material ratios of up to 40:1 in the extraction stages which give a higher yield of extractable protein than that generally achieved by prior art processes. Also, the ultrafiltration processing techniques used in the present invention can be used to concentrate the protein in the liquid extract to a wide range of concentrations. This results in a family of liquid protein concentrates for cooking and precipitating true curds having a variety of characteristics.

The present invention, accordingly, makes it possible to produce a highly versatile, high percentage protein true curd which can be subjected to various treatments to induce particularly desired characteristics. Such characteristics may include consistency, odor, tenderness, flavor, and texture. Of particular interest are solid, true curd products which are meat-like in that they are firm but chewy, can be readily sliced, and resist disintegration in boiling water. Product characteristics may be controlled by varying such factors as the treating temperature, the length of heat treatment, and the addition and rate of addition of certain chemical reagents. When the starting source material has not been defatted as required by the prior art, an oil fraction can be retained in the protein curd in varying proportions and thereby alter its characteristics further. Alternatively, oil can be added to the protein prior to its coagulation as a true curd.

A general object of this invention is to provide a process for the isolation of protein and oil of high grade and quality for use as food products or food ingredients from undefatted whole oilseeds such as soybeans, glandless cottonseed, peanuts, sesame seeds, safflower seeds, and/or any other suitable type of edible oilseed or from these oilseeds after defatting. More particularly, when the protein and oil food products are obtained from undefatted oilseeds, which have not been heat-treated, a higher yield of protein product is obtained and desolventization of the starting materials is avoided. The removal of this step saves time and money, and reduces the safety and pollution hazards inherent in the use of flammable solvents as well as preventing protein denaturation prior to oil extraction.

The invention in a preferred form provides a process for the production of an oil and/or protein food product, wherein the protein extracts are purified by ultrafiltration to remove odor, flavor and flatulence-causing compounds from the final product. The use of ultrafiltration membranes also yields a whey-like permeate which can be purified by reverse osmosis so as to produce an effluent water suitable for either reuse through the system, or for direct discharge into the environment with no need for further purification.

DETAILED DESCRIPTION OF THE INVENTION

In one preferred embodiment of the present invention, whole oilseeds, particularly soybeans, may be converted to fine particles such as undefatted flour by first milling or grinding them, as in a Bauer Comminuting Mill equipped with peanut butter milling plates. Beans or seeds are fed to the mill or grinder simultaneously with hot water using a water:bean weight ratio of about 4:1. This can be increased to as high as 10:1 or as low as 1:1 in some instances.

The addition of hot water deactivates the enzyme lipoxygenase which is present in the seed or bean and is significantly responsible for the production of poor taste and unwanted odors associated with products of conventional soybean processes. When a seed or bean is bruised, cracked, or broken, lipoxygenase comes into contact with polyunsaturated oils and fats also present in whole seeds. The enzyme oxidizes these substrates and results in a poor tasting product. Heat treating deals with this problem. The hot water must be hot enough to deactivate the enzyme (up to 67°-70° C.), preferably about 60° C.), but cannot be so hot (85° C.) so as to denature the structural proteins sought to be isolated. The present invention achieves this.

The fat and protein-containing slurry obtained from the grinding step is then dispersed in additional water, preferably sufficient to provide a total water:bean ratio of from about 12:1 to 20:1 (water:original bean weight). Ratios up to 40:1 are permissible. This slurry is then extracted at about 140° F. (60° C.) through the addition of a suitable alkali solution, preferably calcium hydroxide [$Ca(OH)_2$], until the pH of the slurry is neutral or slightly basic (pH 8).

The amount of oil and protein extracted from the oilseed itself is a function of time, temperature, pH, and degree of comminution. However, the greater the period of time that the slurry is exposed to the higher temperatures, the greater the probability of protein denaturation occurring.

After an appropriate time for protein solubilization, the insoluble residue is separated by centrifugation from the liquid extract containing the solubilized protein and oil fractions. The initial slurry is subjected to two phase (solid/liquid) centrifugation to give a full-fat extract containing oil, protein, and water. The full-fat extract may be processed "as is" or further separated by a three phase (solid/oil/liquid) centrifugation to yield a low-fat protein extract and an emulsified oil fraction.

The full-fat or low-fat protein extracts are generally processed by ultrafiltration in which macromolecules are retained by a filter medium, while solvent and other low molecular weight solutes are allowed to pass through. It is the low molecular weight proteins to which the undesirable flavor and odor causing compounds attach. The filter medium generally comprises a thin plastic sheet or membrane containing pores evenly distributed over its surface. Flow rates of the solvent and low molecular weight solutes through these membranes are quite high, because the pore volume is approximately 80% of the total membrane volume. The molecular weight cut off (MWCO) value determines the size of the molecules retained by the filter. The MWCO values used in the process described herein can range from 10,000–100,000, but preferably from 50,000–100,000.

The full-fat or low-fat protein extract may be pasteurized prior to ultrafiltration using methods well known in the art, and the pH is adjusted with a suitable acid to a pH somewhat above that at which protein will precipitate from solution. The liquid extract is then pumped directly to an ultrafiltration system for membrane filtration which results in protein concentration and purification. Optionally, a diafiltration technique can be employed at this point to more efficiently separate low molecular weight compounds from the larger protein molecules. This step adds water to the protein extract feed at the beginning of the ultrafiltration process (or at any later point in the processing cycle) at the same rate at which the ultrafiltration permeate is removed, whereby the feed volume is maintained at a substantially constant level from that point until a later point, whereby approximately 0.75 to 3.0 times the original feed volume of the permeate is collected. This results in increased protein purification from the smaller carbohydrates, minerals, and other compounds. Again, it is these elements that are partly responsible for poor taste and undesirable colors and odors in products from the conventional processes.

The ultrafiltration retentate contains the protein macromolecules that are unable to pass through the "holes" of the ultrafiltration membrane. Ultrafiltration then can serve not only as a means to separate the protein fraction from low molecular weight compounds in the extract, but to concentrate it as well. Retentates can be partially or fully concentrated in that they can be removed at any time during the ultrafiltration process. The longer the protein isolate is left in the system, the more concentrated it becomes.

The ultrafiltration retentates which contain the protein removed from the extract may be heated for 10 to 15 minutes at about 95° to 98° C. and coagulated to form a true curd. Use of 100° C. or higher temperatures may cause excessive hardening of a curd and should be avoided. A coagulant such as calcium chloride ($CaCl_2$), citric acid ($CH_3CH_2COOH$), hydrochloric acid (HCl), calcium sulphate ($CaSO_4$), and gluconic acid lactone ($C_6H_{10}O_6$) is preferably used. The addition of the appropriate reagent adjusts the pH to a point where the protein precipitates from solution. The protein curd is then separated from the whey, preferably, by either centrifugation or a suitable filtration method.

The rate at which the coagulant is added and stirred will also affect the consistency and texture of the ultimate product. Rapid addition together with rapid stirring will render a small curd, almost hamburger-like in texture. Slow addition together with slow mixing results in a larger, denser curd similar to beef or chicken.

Membrane processing of the extract provides the option of selecting a desired protein content in the extract at the time of coagulation. By varying the protein concentration, different properties may be achieved in the curds produced. Also, since the technique of concentrating the protein is available, higher water-to-flour or seed material ratios may be used without producing an extract in which the protein is too dilute for desired coagulation. In conjunction with varying the temperatures employed when heating the membrane retentates, protein concentration may be used to control and thereby affect the consistency and the texture of the curd produced. Since flavor and flatulence or odor-causing compounds are removed by ultrafiltration, a bland product is produced which will easily absorb the flavoring of any seasoning and may thereby be used in a variety of ways. Texture and consistency may also be varied by controlling the amount of oil retained from the full-fat extract. Both oil and protein may be retained by the ultrafiltration membrane and processed so that the final product contains up to 30% oil.

When an emulsified oil fraction is separated from the full-fat extract during the initial three phase centrifugation and preparation of a low-fat protein extract, this separate oil fraction may be deemulsified, purified and utilized as a food ingredient as well.

These oil emulsions can be broken down for the recovery of purified oil by any of the methods known in the art. The preferred method is to add oil to emulsion or evaporate the water of the emulsion until the final moisture content of the oil emulsion becomes less than 23%, and then centrifuge the emulsion at approximately 45°–75° C.

As mentioned previously, the present invention utilizes whole, undefatted oilseeds or defatted oilseeds as the protein source. The use of undefatted oilseeds or other oilseed materials enables one to utilize three phase centrifugation to separate the oil fraction from the protein fraction in such a manner that the final protein curd retains a desired level of oil content. This presents another means to change the properties of the final protein product. This option is not possible in most prior art processes, since the oil is totally removed from the starting source material during the defatting step.

The water effluent that has been collected over the various centrifugations and separations may be purified further using reverse osmosis membranes which render it substantially pure and suitable for reuse or discharge into the environment. Reverse osmosis uses semi-permeable membranes which retain virtually all the dissolved molecules, including salts and sugars, while essentially allowing only solvent, in this case water, to pass.

Reverse osmosis can be used to concentrate a solution but cannot separate solutes from one another. Osmotic pressure acts to drive the purified solvent back into the feed solution and a sufficiently higher pressure (generally higher than in ultrafiltration) must be applied to the solution to overcome the osmotic pressure and drive the solvent from the solution through the membrane at a satisfactory rate.

The permeate or whey, which is everything not retained by the membrane after ultrafiltration and centrifugation, contains the unwanted sugars, minerals, and other compounds that would otherwise pollute the environment if discharged directly from the system. Effluent discharged after reverse osmosis, however, is water that is cleaner than before it entered the system prior to the initial grinding step and contains fewer solids than normal tap water. Hence, it can be discharged directly into the environment or reused and recycled through the system. This feature drastically reduces water consumption and thereby enhances the process economics. Reverse osmosis retentate also may be dried and marketed as an animal feed ingredient or for other uses.

While a preferred embodiment of the present invention as described above employs undefatted oilseeds, particularly soybeans, as the starting material, in another preferred embodiment defatted oilseeds in the form of flakes, meal or flour may be successfully used. These preferred embodiments will be illustrated hereinafter by drawings and examples.

PREFERRED EMBODIMENT OF THE INVENTION

Figure 1:
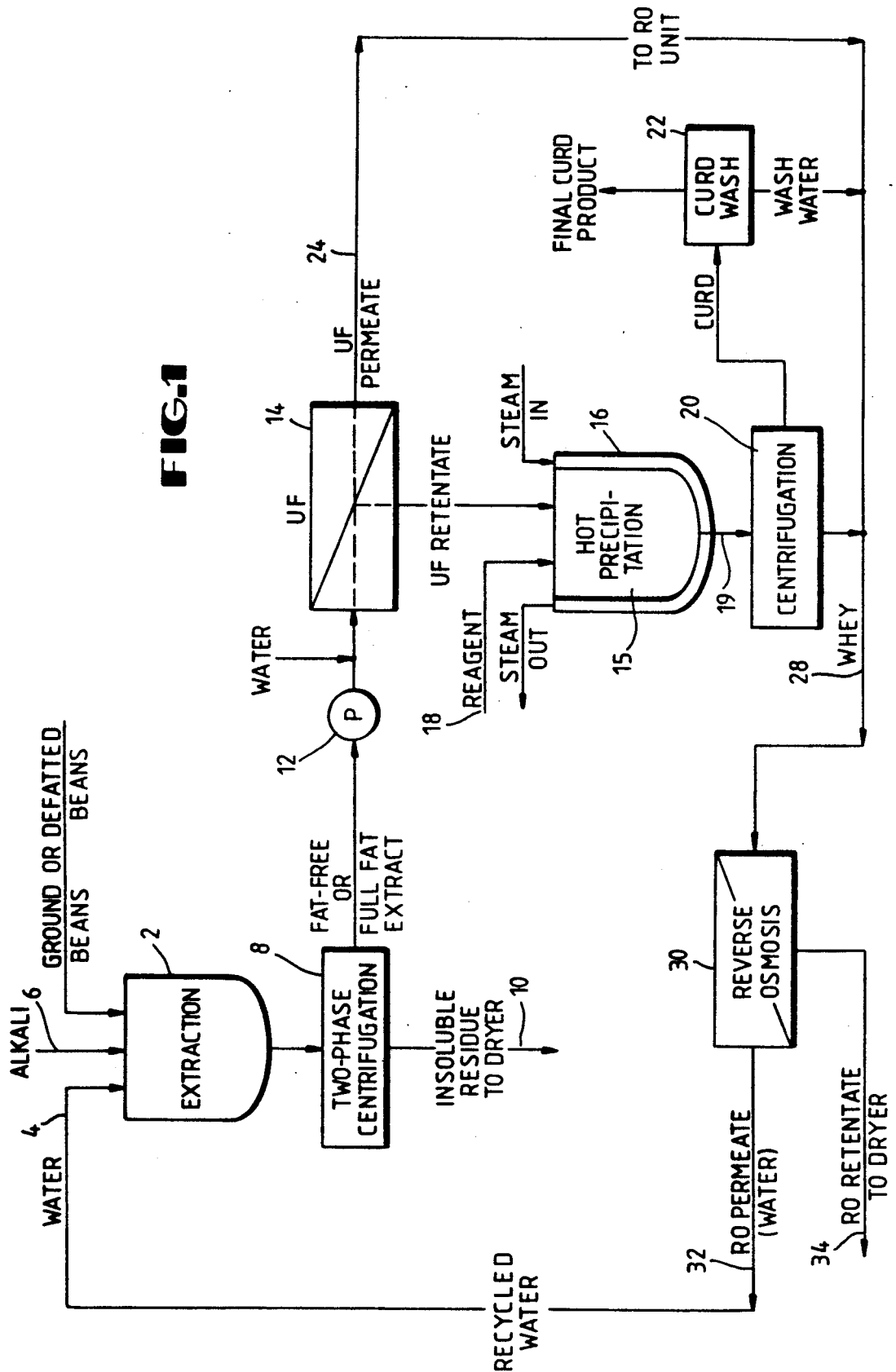
FIG. 1 is a flow diagram of an embodiment of the present invention using either whole soybeans with two-phase separation to yield a full-fat extract as the starting material for ultrafiltration, or defatted soybeans with two-phase separation to yield an essentially fat-free extract for ultrafiltration.

Referring to FIG. 1, the present invention and means for producing same in one of its preferred embodiments will be more fully described. Not shown is a mill, such as a Bauer mill where the beans are ground and mixed with hot water [140° F. (60° C.)] using a 4:1 water:bean weight ratio. The resulting slurry is mixed in an extraction chamber or vessel 2 with either fresh water or recycled water 4 in an additional 16:1 water:original bean weight ratio.

The slurry is adjusted to a neutral or slightly basic pH of 8.0 through the addition of a suitable alkali 6, preferably calcium hydroxide [Ca(OH)$_2$]. The extraction process whereby the calcium hydroxide solution solubilizes the protein is carried out for about sixty (60) minutes by stirring at a slow speed at a temperature of about 140° F. (60° C.). The undefatted protein extract containing protein and oil is then separated from the insoluble residue by two phase centrifugation—e.g., utilizing a Westfalia continuous separator 8.

The insoluble residue 10 can be removed after centrifugation from the aqueous full-fat extract, dried and used as a component in animal feed. The full-fat extract is then pumped 12 under pressure through the ultrafiltration system 14 typically comprised of a Romicon PM100 industrial hollow fiber cartridge containing 100,000 molecular weight cut off (MWCO) membrane. During the ultrafiltration process, the extract is ultimately reduced to about 35% of its original volume after a diafiltration period in which water is added to the feed to keep the feed volume constant. Here much of the undesirable low molecular weight sugars, carbohydrates and polyphenolic compounds are removed.

The ultrafiltration retentate, which contains the desired protein macromolecules that do not pass through the ultrafiltration membrane, is concentrated by stopping water addition to the feed while removing additional permeate 24 from the system. The protein retentate is removed from the ultrafiltration membrane and transferred to a hot coagulation or precipitation chamber 15 heated by a steam sleeve 16. The retentate is heated to approximately 208° F. (98° C.) and precipitated or coagulated through the addition of a suitable salt reagent 18, preferably calcium chloride (CaCl$_2$). Sodium chloride may also be used, but has a drawback in that people prone to hypertension or high blood pressure may need to be advised of possible adverse consequences.

The coagulation of the retentate is an important step in formation of the desired consistency and texture of the true curd produced. Three methods, known in the art, may be utilized for the precipitation of protein from solution. Heat treatment, acid or salt addition all precipitate the protein as a different protein matrix due to the different molecular interactions induced by each treatment. It has been found however, that the use of two or three methods together results in the greatest protein yield.

The precipitated full-fat protein curd (protein and oil) 19 is separated from the whey through two-phase centrifugation 20 or by filtering through a nylon bag. The curd thus formed contains approximately 30% oil which gives the curd texture, taste and consistency never before possible in prior art curd processes since the oil has always been conventionally removed during the defatting step. This curd product is then washed 22 with water to remove any remaining salt from the coagulation step. Temperature treatment, flavor and color enhancers may be added at this time to create the desired food ingredient. The true curd so produced is bland with a meat-like texture comprised of a protein lattice work that can be cut with a knife. Lower oil contents yield tougher, chewier products.

The various permeates 24 or wheys 28 collected from the ultrafiltration 14, curd centrifugation 20 and wash steps 22 may be processed by reverse osmosis membranes 30 under high pressure (not shown) to yield an effluent or permeate of purified water 32. This then can be recycled through the system or discharged into the environment with no fear of pollution. Any remaining insolubles, sugars, phenols, proteins, etc., may be dried and processed 34 and added to the animal feed component 10.

Figure 2:
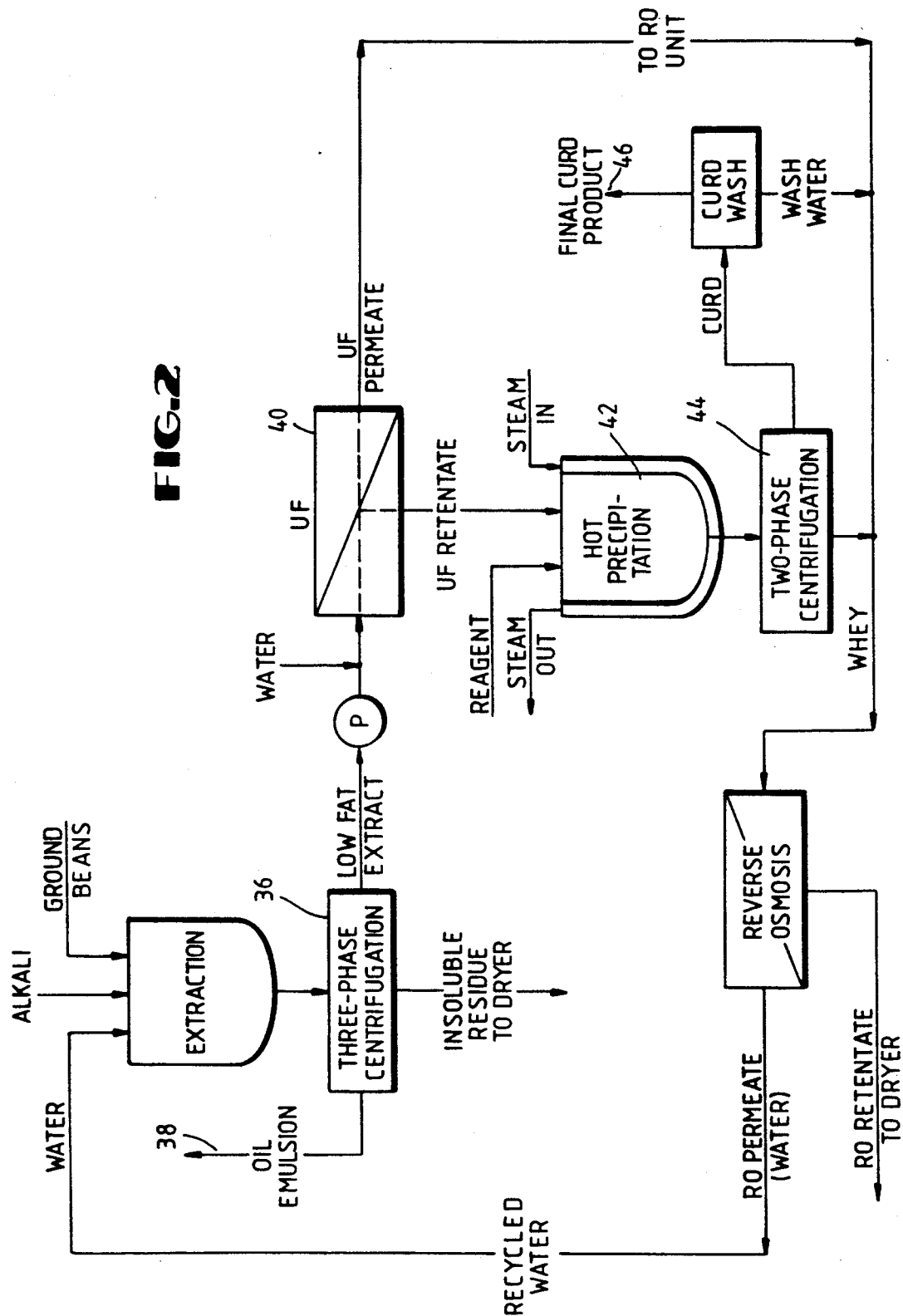
FIG. 2 is a flow diagram of a second embodiment of the present invention utilizing whole soybeans subjected to three phase centrifugation to produce a low-fat extract as a starting material.

A second embodiment, similar to the first, is shown in FIG. 2 in which three phase centrifugation 36 is utilized after the extraction step. Three phase centrifugation separates the protein and oil fractions into two distinct phases separate from the insoluble particles. This results in an oil emulsion fraction 38 which can be further processed and recovered as a pure oil product for use as a food additive or ingredient. This also permits the recovery of a low-fat protein extract which after ultrafiltration 40, coagulation 42 and centrifugation 44 may be prepared as an essentially pure low fat true protein curd 46. The remaining steps of the process are essentially the same as those of FIG. 1.

The true curd so produced is tougher and chewier in consistency than those produced with an oil fraction. The poor tasting polyphenolic compounds and sugars are removed in the oil fraction and later on through the removal of the low molecular weight proteins through ultrafiltration. It is therefore bland and colorless, but through the addition of various seasonings and flavor enhancers may yield a meat-like product such as chicken, fish or beef.

A third embodiment, utilizing a different starting material, is shown in FIG. 1 as a modification of the first embodiment. Defatted soybean flakes, meal or flour is mixed in the extraction chamber or vessel 2 with either fresh water or recycled water as shown 4 using a 10:1 to 30:1 water:original defatted bean weight ratio.

The slurry is adjusted to a neutral or slightly basic pH of 8.0 through the addition of a suitable alkali 6, preferably calcium hydroxide [Ca(OH)$_2$]. The extraction process whereby the calcium hydroxide solution solubilizes the protein is carried out for 40 to 50 minutes at approximately 110° F. (43° C.) by stirring at a slow speed. The fat-free protein extract is then separated from the insoluble residue 10 by two phase centrifugation 8. The remaining steps of the process are essentially the same as those of the first embodiment, i.e., ultrafiltration, precipitation by heat and chemical addition, curd separation and wash, and reverse osmosis processing of ultrafiltration permeate whey, and curd wash water. Use of a defatted flake as a starting material does not allow the option of varying the consistency and texture of the final product through the presence of oil, except by the deliberate addition of oil prior to coagulation.

Figure 3:
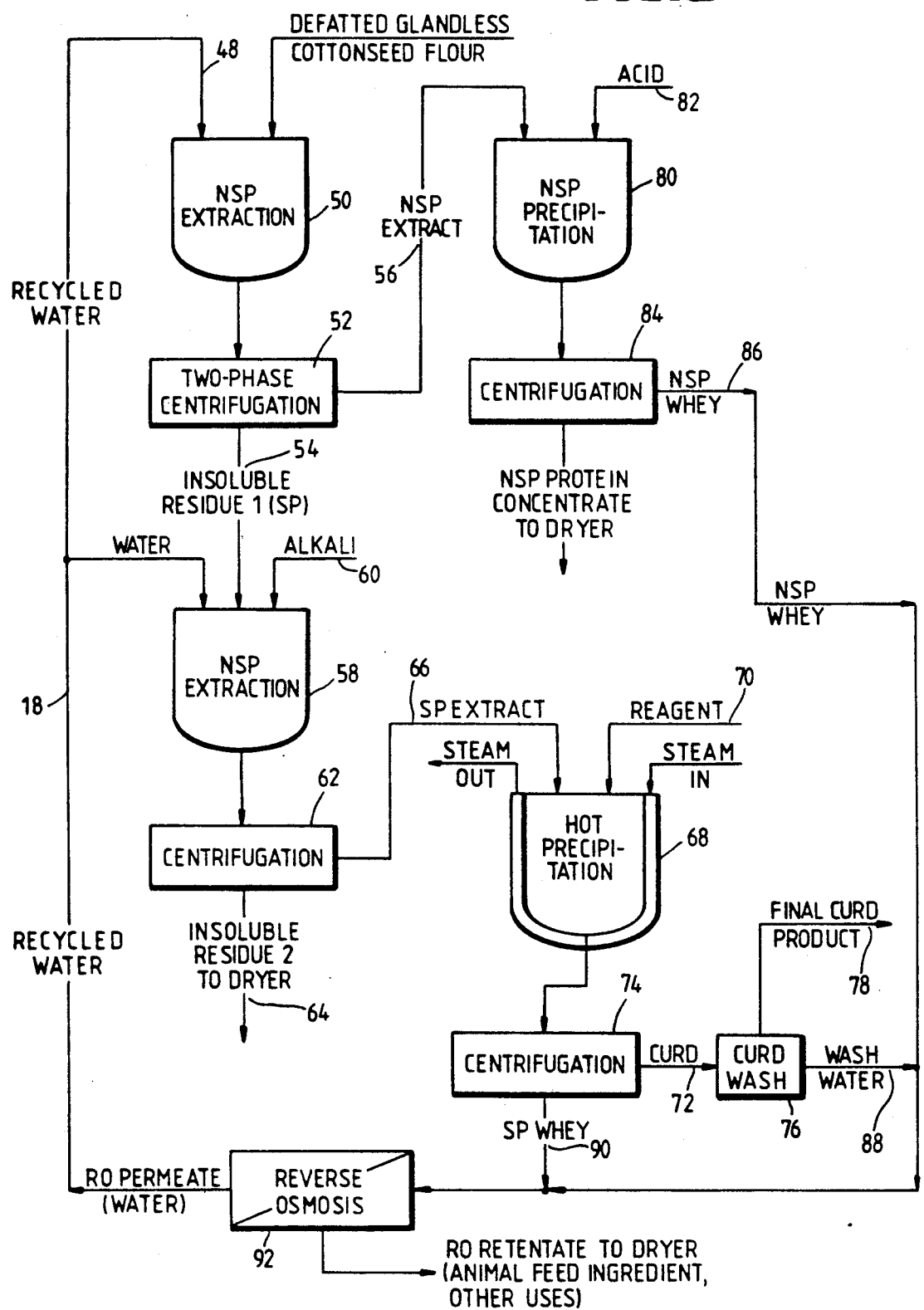
FIG. 3 is a flow diagram of a third embodiment of the present invention using defatted glandless cottonseed flour as the starting material. The storage protein extract (as shown) does not require concentration by ultrafiltration. However, ultrafiltration (not shown), optionally, may be employed when unusually high protein concentrations are desired.

As a final embodiment, FIG. 3 shows the processing of a true curd from defatted glandless cottonseed flour. Defatted glandless cottonseed flour is dispersed in filtered water 48 at about a 12:1 water:flour ratio by weight, the cottonseed flour/water slurry is heated to about 115° (46° C.) and stirred for thirty minutes without pH adjustment in an extraction tank 50 in order to extract the soluble protein from the insoluble materials. The insoluble materials can be separated from the solubilized protein by two phase centrifugation 52. The solid particles 54 at this point retain the storage protein (SP) while the liquid extract contains the nonstorage protein (NSP) 56.

The insoluble, solid residue 54 containing the storage protein is extracted a second time 58 after centrifugation by mixing it in filtered water 48 at about a 6:1 water:original flour weight ratio. The pH of the mixture is then adjusted to 9.0-10.0 by the addition of a suitable alkali 60, preferably sodium hydroxide (NaOH). The slurry is then centrifuged a second time 62 to obtain a storage protein extract 66 for curd preparation. The insoluble residue 64 collected as a result of the second centrifugation 62 may be dried and processed as animal feed.

The glandless cottonseed storage protein extract 66 can be processed into a curd by heating it by a steam jacket 68 at 176° F. (80° C.) for approximately 15 minutes. Gluconic acid lactone or other suitable reagent 70 is added rapidly with only minimal stirring in order to precipitate the storage protein fractions. The curd 72 is then separated from the whey either by an additional two-phase centrifugation 74 or by selectively forcing the whey under pressure through a nylon bag filter or other suitable filter. Again, the consistency and texture of the curd can be controlled by the rate of reagent addition and speed of stirring.

As in the aforementioned embodiments, the true curd 72 is washed 76 to remove any residue of the reagent salt that may still adhere to the curd product. The curd product may then be heat treated, flavored and colored with chemical additives as desired to produce the final curd product 78. The curd product produced through the aforementioned process will be essentially fat free, since the use of defatted glandless cottonseed flour will be an oil free starting material.

The nonstorage protein extract 56 separated during the initial two phase centrifugation 52 is precipitated 80 through the addition of an appropriate acid such as hydrochloric acid (HCl) 82, until the pH reaches a point of minimum protein solubility (pH 4). The nonstorage protein is then centrifuged (84) to separate the curd and whey fractions.

The nonstorage protein fraction and the storage protein extracts can be purified and concentrated through the optional use of ultrafiltration after protein extraction.

The nonstorage protein whey 86, the wash water from the storage protein curd wash 88 and the storage protein whey 90 are preferably collected and processed using reverse osmosis membranes (92) to produce a clean effluent, as in all embodiments of this invention.

The final embodiment of the present invention discloses for the first time a true curd prepared from a glandless cottonseed protein extract. Attempts to produce a true meat-like curd from glandless cottonseed protein were unsuccessful before development of the embodiment shown in FIG. 3. In prior experiments, attempts were unsuccessful because the glandless cottonseed protein extracts tested contained both the nonstorage and storage proteins. True curds were produced from glandless cottonseed protein only after discovering that it was necessary to first remove the low molecular weight nonstorage proteins from the extract and then precipitate the larger-sized storage proteins as a curd. The storage proteins, as described earlier, constitute about two and one half times as much of the total cottonseed protein as do the nonstorage proteins.

The invention will now be more fully described in terms of the following examples. These examples are provided in order to better elaborate and describe the invention and in no way should be understood as limiting. Whereas examples 1–5 pertain to the preparation of a soy protein and example 6 pertains to a glandless cottonseed product, other oilseeds may be used as starting materials in the same manner. The examples are then followed by tables which set forth data in terms of composite percentages, comparative chemical analyses, etc.

EXAMPLE 1

Soybeans were converted to a full-fat flour by grinding with a Bauer mill equipped with peanut butter plates. Forty pounds of beans were fed to the mill simultaneously with hot water at 140° F. (60° C.), using a 4:1 (w/w) water-to-bean ratio. Slurry from the grinding step then was dispersed in additional water (16:1 water-:original bean weight). The slurry then was adjusted to pH 8 with calcium hydroxide and extracted for 60 minutes by stirring at slow speed at 140° F. (60° C.). Percentages of solids, nitrogen, and oil extracted are shown in Table 1 below. The percentage of nitrogen is directly proportionate to percent protein. Undefatted extract containing protein and oil then was separated for ultrafiltration (UF) processing from the insoluble residue with a Westfalia Type SAF-06 continuous separator.

Thirty six gallons of full-fat extract were processed to concentrate the protein and oil. After reducing the extract to 35% of the original volume by ultrafiltration techniques, 31.6 pounds of the retentate (designated UF Retentate 1) were removed for curd preparation. The remaining retentate was further processed to a higher concentration of protein and oil. The retentate as finally discharged (designated UF Retentate 2) weighed 28.25 pounds.

The UF processing above was performed using a single Romicon PM 100 industrial hollow fiber cartridge containing 26.5 $ft^2$ (2.4 $m^2$) of 100,000 molecular weight cut off (MWCO) membrane. The total volume of permeate collected throughout the processing period equalled 1.83 times the volume of original feed.

During UF processing, filtered water was added to the original feed at the same rate that permeate was removed through the membranes (thereby keeping the feed volume constant) until 41.4 gallons of permeate had been collected (1.15 times the original feed volume). After collecting 41.4 gallons of permeate, water addition was stopped and the protein and oil in the feed were further concentrated by removing an additional 30.6 gallons of permeate.

Three gallons of UF Retentate 1 were heated to 208° F. (98° C.) for 10 minutes and 505 ml of 12% calcium chloride ($CaCl_2$) solution was rapidly added to the hot retentate with minimal stirring to precipitate the curd. After the whey rose to the top, curd was separated from the whey by forcing the whey under pressure through a nylon bag filter. A true curd was precipitated that was spongy, meat-like, odorless and bland with a whitish color. The percentages of solids, nitrogen and oil extracted are given in Table 1, while sensory and textural characteristics of curds are listed in Table 2. Table 3 on the other hand compares the composition on a dry weight basis of curds produced by the different procedures employed in the different examples with respect to ash, nitrogen, protein and oil. Tables 1, 2 and 3 are included below following Example 5, because of their relevance to examples other than Example 1.

EXAMPLE 2

Twenty eight pounds of the final UF retentate (UF Retentate 2) from the processing trial of Example 1 were heated to 208° F. (98° C.) for 10 min, and 505 ml of 12% $CaCl_2$ precipitate the curd. After whey rose to the top, curd was separated from the whey by forcing the whey under pressure through a nylon bag filter. A true curd was precipitated that sliced easily after pressing in a tofu press. The curd was meat-like, odorless and bland with a spongy, rubbery texture. It was not as light in color as the curd from Example 1.

EXAMPLE 3

Seven hundred ml of UF Retentate 1 from the processing trial of Example 1 were heated to 208° F. (98° C.) for 10 min. Twenty five mls. of 12% $CaCl_2$ solution were added rapidly with minimal stirring to precipitate the curd. After whey rose to the top, the curd was separated from the whey by centrifugation in a bottle-type laboratory centrifuge at 2000 rpm for 10 minutes. A true curd was produced that was light-cream in color and somewhat softer than the curds of Examples 1 and 2. The curd was meat-like, spongy and desirable in texture.

EXAMPLE 4

Protein was extracted from defatted soybean flour by dispersing 30 pounds of A. E. Staley I-200 soybean flour in deionized water at a 10:1 (w/w) water-flour ratio. Extraction was continued for 50 minutes by stirring at slow speed at 110° F. (43° C.). Percentages of solids and nitrogen extracted are shown in Table 1 below. The protein extract for UF processing then was separated from insoluble residue with a Westfalia Type SA7-06 continuous separator.

Approximately 15 gallons of defatted flour extract with 36 gallons of water added were UF processed (water was added to dilute the feed to the membranes since a low water:flour ratio was employed during extraction). UF processing was performed using two Romicon PM 100 industrial hollow fiber cartridges containing 26.5 ft$^2$ (2.46 m$^2$) each of 100,000 MWCO membrane. The total volume of permeate collected throughout the processing cycle equalled 2.5 times the volume of original feed.

During UF processing, filtered water was added to the original feed at the same rate that permeate was removed (to maintain the feed volume constant) until 86.1 gallons of permeate had been collected (1.7 times the original volume of feed). After collecting 86.1 gallons of permeate, water addition was stopped and the protein further concentrated by removing an additional 43.1 gallons of permeate.

Six gallons of UF retentate, slightly diluted by the addition of water used to flush it from the UF system while discharging it, were heated at 194°-204° F. (90°-95° C.) for 10 minutes. Fifteen hundred ml of 12% CaCl$_2$ solution were added to the cooked retentate (with stirring) at the start of the cooling period. After the whey separated from the curd, the curd was filtered from the whey by forcing the whey under pressure through a nylon bag filter.

A true, elastic curd was obtained that was very firm and ropy in texture. The curd was grayish-white in color and bland in taste. Some traces of CaCl$_2$ remained because of inadequate washing during the precipitation step.

EXAMPLE 5

Protein was extracted from defatted soybean flour by dispersing 30 pounds of A. E. Staley F-200 soybean flour in filtered water at a 20:1 (w/w) water:flour ratio. The slurry pH was adjusted to 8.0 with Ca(OH)$_2$. Extraction was continued for 40 min by stirring at slow speed at 131°-140° F. (55°-60° C.). Percentages of solids and nitrogen extracted are shown in Table 1. The protein extract for UF processing then was separated from the insoluble residue with a Westfalia Type SA7-06 continuous separator.

Thirty six gallons of defatted soybean flour extracted was UF processed. UF processing was accomplished using a single Romicon PM 100 industrial hollow fiber cartridge containing 26.5 ft$^2$ (2.46 m$^2$) of 100,000 MWCO membrane. The volume of permeate collected throughout the processing cycle equalled 1.93 times the volume of extract processed.

During UF processing, filtered water was added to the extract feed at the same rate that permeate was removed (to maintain the feed volume constant) until 41.4 gallons of permeate had been collected (1.15 times the volume of extract processed). After collecting 41.4 gallons of permeate, water addition was stopped and the extract further concentrated until it was reduced to approximately 35% of its original volume.

Three gallons of UF retentate prepared by concentrating the extract to about 35% or its original volume after ending the diafiltration (water addition) phase, was removed from the membrane system for heating and curd precipitation. The UF retentate was heated to 199°-201° F. (93°-94° C.) for 12 min. The curd then was precipitated by adding 505 ml of 12% CaCl$_2$ solution to the hot retentate with minimal stirring. After the whey separated from the curd, the curd was filtered from the whey by forcing the whey under pressure through a nylon bag filter.

A true curd was precipitated that was spongy and rubbery in texture. The curd was grayish-white in color and bland tasting.

TABLE 1

Solids, Nitrogen and Oil Extracted from Defatted or Undefatted Soybean Flours During Curd Preparation

| Measurement | Defatted Flour Water:Flour Ratio | | Undefatted Flour Water:Flour Ratio |
|---|---|---|---|
| | 10:1$^b$ | 20:1$^c$ | 20:1$^a$ |
| Flour Solids Extracted, % | 46.6 | 58.7 | 63.0 |
| Flour Nitrogen Extracted, % | 52.3 | 64.4 | 75.3 |
| Oil Extracted, % | — | — | 61.6 |

$^a$Example 1
$^b$Example 4
$^c$Example 5

TABLE 2

Sensory and Textural Characteristics of Curds from UF Retentate from Undefatted Soybean Flour

| Product from Example | Sensory and Textural Attributes |
|---|---|
| 1 | A true curd was precipitated that was spongy, meat-like, odorless, and bland. The curd was whitish in color. |
| 2 | A true curd was precipitated that sliced easily after pressing in a tofu press. The curd was meat-like, odorless and bland with a spongy, rubbery texture. It was not as light in color as the curd from Example 1. |
| 3 | A true curd was produced that was light-cream in color and somewhat softer than the pilot plant curds of Examples of 1 and 2. The curd was meat-like, spongy and desirable in texture. |
| 4 | A true, elastic curd was obtained that was very firm and ropy in texture. The curd was grayish-white in color and bland in taste. Some trace of CaCl$_2$ remained because of inadequate washing during the precipitation step. |
| 5 | A true curd was precipitated that was spongy and rubbery in texture. The curd was grayish-white in color and bland tasting. |

TABLE 3

Composition of Curds from Defatted and Undefatted Soybean Flours Using Different Preparation Procedures

| Product From Example | Total Solids % | Ash | Nitrogen | Protein (NX6.25) | Oil |
|---|---|---|---|---|---|
| | | | Dry Weight Basis (%) | | |
| 1 | 25.78 | 6.98 | 9.47 | 59.27 | 30.23 |
| 2 | 29.06 | 5.16 | 10.19 | 63.77 | 25.15 |
| 3 | 21.44 | 8.12 | 10.26 | 64.18 | 29.38 |
| 5 | 30.98 | 8.49 | 8.65 | 54.07 | 0.81 |

(NX6.25) represents a nitrogen conversion factor used in the food science industry converting the amount of nitrogen to protein.

EXAMPLE 6

Glandless cottonseed storage protein extract was prepared from defatted glandless cottonseed flour by dispersing 22 pounds of flour into filtered water (12:1 water:flour ratio by weight) and extracting it with slow stirring for 30 minutes at 115° F. (46° C.) without pH adjustment. After centrifugation to separate the solid residue from the first extract (which contained the water-soluble nonstorage protein), the solids (containing the storage protein) were reextracted for 30 minutes by dispersion in water adjusted to pH 9.5 with sodium hydroxide (NaOH), at a 6:1 water:original flour ratio. The slurry then was centrifuged to obtain the storage protein extract for curd preparation.

Four gallons of glandless cottonseed flour storage protein extract was heated to 176° F. (80° C.) for 14 minutes. An amount of gluconic acid lactone sufficient to fully precipitate the storage protein curd was added rapidly with minimal stirring. After the whey separated from the curd, the curd was removed from the whey by forcing the whey under pressure through a nylon bag filter.

A comparative solids and nitrogen analysis (which is directly proportional to the amount of protein) between storage and nonstorage protein extracts are presented in Table 4. Sensory and textural characteristics of the curd from Example 6 are presented in Table 5. A proximate analysis of Example 6 curd is given in Table 6.

TABLE 4

Solids and Nitrogen Extracted from Defatted Glandless Cottonseed Flour During Curd Preparation

| Measurement | Protein Component | |
|---|---|---|
| | Nonstorage | Storage |
| Flour Solids Extracted, % | 25.60 | 34.68 |
| Flour Nitrogen Extracted, % | 16.42 | 47.00 |

TABLE 5

Sensory and Textural Characteristics of Curd from Storage Protein Extract from Defatted Glandless Cottonseed Flour

| Product from Example | Sensory and Textural Attributes |
|---|---|
| 6 | A true curd was precipitated that was lighter in color than previous storage protein curds. The curd was spongy and did not break up easily. |

TABLE 6

Composition of Curd from Storage Protein Extract from Defatted Glandless Cottonseed Flour

| Product From Example | Total Solids % | Ash | Nitrogen Dry Weight | Protein (NX6.25) Base (%) | Oil |
|---|---|---|---|---|---|
| 6 | 29.74 | 1.56 | 15.47 | 96.64 | 0.77 |

As the results indicate, true curds were formed in each one of the examples. A true curd is a protein curd that will not disintegrate when boiled. This feature enables the product of the present invention to be used in a large number of food applications not heretofore possible. The absence of color and the bland taste make the curds easy to flavor and/or color for any desired ingredient or supplement.

The large water:flour ratios shown in Table 1 enable the practitioner of the invention to produce a better quality product with a greater percentage of protein extracted. Prior art processes render a lesser percentage of protein extracted due to their need for low (or lower) water:flour weight ratios. The prior art processes need greater concentrations of solubilized protein in order to effect proper curd formation. However, high water:flour weight ratios in those processes have resulted in lower protein. Using ratios of from only 4:1 to 9:1 have enabled prior art processes to extract only 50-55% of the protein present in defatted soybeans. The higher ratios of the present invention, such as 20:1 as seen in the examples, enable the practitioner to solubilize a significantly greater percentage of protein from the insoluble bean particles into solution. The lesser the concentration is of a compound in a solution, the greater the ease of solubilizing the portion which is still solid.

The present invention makes it possible to use higher water:seed material weight ratios due to the employment of ultrafiltration membranes. This feature enables the practitioner to solubilize the protein in an amount of water which increases the amount of protein that can be solubilized. While this may be too much water to permit efficient precipitation of the curd by prior art methods, the ultrafiltration membranes permit concentration of the solubilized protein macromolecules by reducing the water volume and thereby render the retentate susceptible to precipitation with a higher number of protein molecules to precipitate. The higher the water/seed material weight ratio, the greater the diffusion rate from the insoluble solids to solution of the desired protein. This higher ratio adversely affects protein precipitation however, and must be reduced through ultrafiltration.

The higher MWCO values of the membranes utilized in the present invention insure a purer protein product. Use of the larger membranes may result in some small protein macromolecules being lost as permeate, but these can be retrieved later by running the permeate through a reverse osmosis system utilizing membranes with smaller MWCO values.

Although the foregoing discussion and examples were directed primarily to soy and glandless cottonseed proteins, it should be understood that the process and invention disclosed herein may be used to process and extract protein curds from peanuts, safflower and sesame seeds as well and their proteins are to be encompassed within the spirit and framework of the present invention. Thus, whole peanuts, safflower and sesame seeds or combinations of these with each other or soybeans and glandless cottonseed storage protein may be processed under substantially the same conditions as set forth above to produce bland and colorless protein products.

It will be apparent to those skilled in the art reading this disclosure that various modifications may be made to the disclosed method without deviating from the overall inventive concept. For example, ultrafiltration may be employed using a variety of membrane systems and membrane types with different MWCO's at various stages in the process in order to purify and concentrate the protein extract to varying degrees. Temperatures may be applied prior to and after precipitation and thereby control the texture and consistency of the final product. Permeates may also be membrane processed using smaller MWCO membranes to extract a greater percentage of protein.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention shown and described are to be taken as the presently preferred embodiments. Various changes may be made in the arrangement of the steps or materials used. For example, equivalent materials may be substituted for those illustrated and described herein, and certain features of the invention may be utilized independently of the use of other features. All this would be apparent to one skilled in the art after having the benefit of this description of the invention.

What is claimed is:

1. A method of producing a true soybean protein curd, comprising the steps of:
   (a) extracting proteins from protein-containing soybean material, wherein inherent enzymes contained in said material have been inactivated, by mixing said material in water at a water/material weight ratio of about 10/1 to about 40/1 and at a pH and a temperature in the range of about 60° C. to about 85° C. which are sufficient to solubilize said proteins;
   (b) separating said solubilized proteins from any insoluble components to yield protein extract and an insoluble residue;
   (c) ultrafiltering said extract through an ultrafiltration membrane with a molecular weight cut-off value that is at least about 50,000 and is sufficient to pass odor-; color-; and taste-forming compounds as a permeate and to retain as a retentate proteins having molecular weights greater than said compounds;
   (d) heating said retentate to a temperature between about 80° C. and about 100° C. which is sufficient, and for a time sufficient, to coagulate said proteins in said retentate as a true curd which does not disintegrate in boiling water; and
   (e) separating said true curd from the remainder of said retentate.

2. The method of claim 1 in which said material comprises undefatted soybeans and said method further comprises, prior to the step of extracting said proteins, grinding the undefatted soybeans in water at a temperature sufficient to deactivate inherent enzymes but insufficient to denature said proteins, and passing the ground soybeans to the extraction step.

3. The method of claim 1 in which said material comprises defatted ground soybeans.

4. The method of claim 2 wherein said undefatted soybeans are ground in water at a temperature between about 60° C. and 85° C.

5. The method of claim 1 wherein said ultrafiltration is through an ultrafiltration membrane with a molecular weight cut-off value between about 50,000 and 100,000.

6. The method of claim 1 wherein a coagulant is added to said retentate in said heating step to aid in coagulating said true curd.

7. The method of claim 6 wherein the coagulant is an acid capable of coagulating said proteins in said retentate.

8. The method of claim 6 wherein the coagulant is a salt capable of coagulating said proteins in said retentate.

9. The method of claim 1 wherein said water used to extract said proteins from said soybean material contains a base selected from a group consisting of calcium hydroxide, sodium hydroxide and potassium hydroxide.

10. The method of claim 7 wherein said acid is selected from a group consisting of citric acid, hydrochloric acid, and gluconic acid lactone.

11. A method of making a true oilseed protein curd from an oilseed material, wherein inherent enzymes contained in said material have been inactivated, said material containing water-dispersible components detrimental to such a curd and having molecular weights less than about 50,000 daltons and proteins having molecular weights greater than said components and capable of forming said curds, which comprises:
   (a) separating an aqueous dispersion of said components from said proteins;
   (b) heating said proteins in an aqueous medium to a temperature, and for a time, and with a quantity of a coagulant, sufficient to coaggulate said proteins as a true curd which does not disintegrate in boiling water; and
   (c) separating said curd from said aqueous medium.

12. A method of making a true oilseed protein curd from an oilseed material, wherein inherent enzymes contained in said material have been inactivated, said material containing water-dispersible proteins greater than about 50,000 daltons and water-dispersible detrimental components having molecular weights less than about 50,000 daltons, which comprises:
   (a) separating said proteins from said components;
   (b) heating said proteins dispersed in an aqueous medium to a temperature greater than about 80° C. and for a time, and in the presence of a quantity of coagulant, sufficient to coagulate said proteins as a true curd which does not disintegrate in boiling water; and
   (c) separating said curd from said aqueous medium.

13. A method of making a true soybean protein curd from undefatted soybeans containing water-dispersible components, including lipoxygenase, detrimental to such a curd and having molecular weights less than about 50,000 daltons, and proteins having molecular weights greater than said detrimental components which comprises:
   (a) grinding said soybeans in water at a temperature high enough to deactivate said lipoxygenase but not so high as to denature said proteins and at a water/bean weight ratio between about 1:1 and 10:1 to form an aqueous dispersion containing said detrimental components, oil and said proteins;
   (b) adding water, as necessary, to said dispersion to adjust the water/bean weight ratio to between about 12:1 and about 40:1, while maintaining the temperature of said dispersion sufficient to deactivate said lipoxygenase;
   (c) separating said dispersion from undispersed components of said beans;
   (d) passing the resulting dispersion through an ultrafilter having a molecular weight cut off value between about 50,000 and 100,000 to pass said detrimental components as a permeate and to retain said oil and proteins as a retentate;
   (e) heating said retentate to a temperature, and for a time, and with a quantity of coagulant, sufficient to coagulate said retentate as a true curd which does not disintegrate in boiling water and which contains said oil; and
   (f) separating said true curd from the remaining retentate.

14. The method of claim 13 in which the weight ratio of water/bean in said grinding step is about 4/1.

15. The method of claim 14 in which said retentate is heated at a temperature between about 80° C. and 100° C. for a time up to about 15 minutes.

16. The method of claim 13 in which said dispersion from said grinding step is separated from said undispersed components of said beans by three phase centrifugation to obtain a separate dispersion of said proteins, a separate aqueous emulsion of said oil, and said undispersed components of said beans; and in which said retentate and said true curd produced by said method are substantially free of said oil.

17. A method of making a true soybean protein curd from defatted soybean material containing components detrimental to such a curd and having molecular weights less than about 50,000 daltons, and also containing proteins having molecular weights greater than said detrimental components, which comprises:
   (a) dispersing said material in an aqueous medium at a water/material weight ratio between about 10/1 and about 40/1;
   (b) separating the resulting dispersion from any undispersed components;
   (c) ultrafiltering the separated dispersion at a molecular weight cut off value between about 50,000 and 100,000 to form a permeate containing said detrimental components and a retentate containing said proteins;
   (d) heating said retentate under conditions of time and temperature and in the presence of a coagulant to form a true curd which does not disintegrate in boiling water; and
   (e) separating said true curd from the remaining portions of said retentate.

18. The method of claim 17 in which said retentate is heated to a temperature above about 80° C. and below 100° C. in the presence of said coagulant to form said true curd.

19. The method of claim 17 in which said defatted material comprises defatted flakes or flour.

20. A method of making a true curd oilseed protein curd from a defatted, glandless cottonseed material wherein said material includes storage proteins (SP) and nonstorage proteins (NSP), which comprises:
   (a) mixing said material with a first aqueous medium having a pH of about 7 to solubilize said NSP;
   (b) separating nonsolubilized components, including said SP, of said material from said solubilized NSP;
   (c) extracting said nonsolubilized components with a second aqueous medium having a pH between about 9 and about 10 solubilize said SP in said second aqueous medium;
   (d) separating remaining nonsolubilized components from said second aqueous medium containing said solubilized SP; and
   (e) heating the separated said second aqueous medium at a temperature, and for a time, and in the presence of a quantity of coagulant, sufficient to coagulate said solubilized SP as a true curd.

21. The method of claim 20 in which said separated second aqueous medium containing said solubilized SP is heated to a temperature between about 80° C. and 100° C. for up to about 15 minutes in the presence of said coagulant to form said true curd.

* * * * *